United States Patent [19]

Hatano et al.

[11] 3,732,545

[45] May 8, 1973

[54] DIGITAL DISPLAY SYSTEM

[75] Inventors: Isao Hatano; Akira Nagano; Kiyoshi Koya, Kyoto-fu, Japan

[73] Assignee: Omron Tateisi Electronics Co., Kyoto-shi, Kyoto-fu, Japan

[22] Filed: Dec. 24, 1970

[21] Appl. No.: 101,276

[30] Foreign Application Priority Data

Dec. 26, 1969 Japan ....................................44/1045

[52] U.S. Cl. ....................................340/172.5, 340/324

[51] Int. Cl. ..............................G06f 3/14, G06k 15/18

[58] Field of Search ..............................340/172.5, 324; 235/157

[56] References Cited

UNITED STATES PATENTS

| | | | |
|---|---|---|---|
| 3,537,073 | 10/1970 | Sakoda et al. | 340/172.5 |
| 3,346,727 | 10/1967 | Lethin et al. | 340/172.5 |
| 3,509,817 | 5/1970 | Sims | 340/172.5 |
| 3,432,845 | 3/1969 | Douglas et al. | 340/172.5 |
| 3,405,392 | 10/1968 | Milne et al. | 340/172.5 |
| 3,501,746 | 3/1970 | Vosbury | 340/172.5 |
| 3,388,384 | 6/1970 | Bogert et al. | 340/172.5 |
| 3,560,954 | 2/1971 | Yanagisawa et al. | 340/172.5 |

*Primary Examiner*—Paul J. Henon
*Assistant Examiner*—Mark Edward Nusbaum
*Attorney*—Craig, Antonelli, Stewart & Hill

[57] ABSTRACT

A digital display system for use in electronic calculating machines and having the features that the highest significant digit of the specific number entered in the calculator is displayed at the leftmost of a display window unit, with the least significant digit at the rightmost side and that unnecessary "0" figures other than those included in the specific number are erased.

2 Claims, 8 Drawing Figures

INVENTORS
ISAO HATANO, AKIRA NAGANO & KIYOSHI KOYA
BY Craig, Antonelli, Stewart & Hill
ATTORNEYS INVENTORS
ISAO HATANO, AKIRA NAGANO & KIYOSHI KOYA
BY Craig, Antonelli, Stewart & Hill
ATTORNEYS

FIG. 4(a)

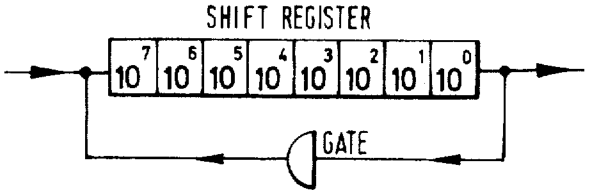

FIG. 4(b)

| | TIMING \ STAGE | $10^7$ | $10^6$ | $10^5$ | $10^4$ | $10^3$ | $10^2$ | $10^1$ | $10^0$ |
|---|---|---|---|---|---|---|---|---|---|
| τ | T1 | $\beta_8$ | $\beta_7$ | $\beta_6$ | $\beta_5$ | $\beta_4$ | $\beta_2$ | $\beta_2$ | $\beta_1$ |
| | T2 | $\beta_1$ | $\beta_8$ | $\beta_7$ | $\beta_6$ | $\beta_5$ | $\beta_4$ | $\beta_3$ | $\beta_2$ |
| | T3 | $\beta_2$ | $\beta_1$ | $\beta_8$ | $\beta_7$ | $\beta_6$ | $\beta_5$ | $\beta_4$ | $\beta_3$ |
| | T4 | \| | \| | \| | \| | \| | \| | \| | \| |
| | T5 | \| | \| | \| | \| | \| | \| | \| | \| |
| | T6 | \| | \| | \| | \| | \| | \| | \| | \| |
| | T7 | $\beta_6$ | $\beta_5$ | $\beta_4$ | $\beta_3$ | $\beta_2$ | $\beta_1$ | $\beta_8$ | $\beta_7$ |
| | T8 | $\beta_7$ | $\beta_6$ | $\beta_5$ | $\beta_4$ | $\beta_3$ | $\beta_2$ | $\beta_1$ | $\beta_8$ |
| τ | T1 | $\beta_8$ | $\beta_7$ | $\beta_6$ | $\beta_5$ | $\beta_4$ | $\beta_3$ | $\beta_2$ | $\beta_1$ |

INVENTORS
ISAO HATANO, AKIRA NAGANO & KIYOSHI KOYA
BY Craig, Antonelli, Stewart & Hill
ATTORNEYS INVENTORS
ISAO HATANO, AKIRA NAGANO & KIYOSHI KOYA
BY Craig, Antonelli, Stewart & Hill
ATTORNEYS

DIGITAL DISPLAY SYSTEM

The present invention relates to a digital display system for use in electronic calculating machines.

In a typical known portable electronic calculator, it is normal to operate the key board to register in the display window the digits associated with the keys that have been operated. This is necessary in order to confirm registration of the correct intended number.

In such a system that is capable of calculating up to eight significant digits, eight (0) figures are illuminated in the display window unit before any keys are operated. These (0) figures are changed to show other decimal digits, as the keys representative of such decimal digits are operated. The (0) figures are normally shifted in the leftward direction to be replaced by other decimal digits in the manner depicted below:

| Key | | Digital Display Windows |
|---|---|---|
| Not Operated | | (00000000) |
| (1) | Key operated | (00000001) |
| (2) | key operated | (00000012) |
| (3) | key operated | (00000123) |

This display procedure is different from the procedure by which the same number (123) is handwritten, so that the operator of such an electronic calculator sometimes feels strange.

Furthermore, in a conventional electronic calculator having, for example, eight display windows each disposed to correspond to the column of the number it displays, it is well known that, when the calculator is in the operative condition, all of the display windows illuminate eight (0) figures. If the keys representative of the number (101) or (0.001) are subsequently operated, the display windows will illuminate (00000101) or (00000.001), respectively. The unnecessary (0) figures sometime have the disadvantage that the operator fails to confirm the exact registration of the intended number, or is otherwise confused.

Accordingly, one object of the present invention is to provide a digital display system in which the number can be registered in the digital display windows in the order from the highest significant digit to the least significant digit without each registered digit being shifted as the keys are operated.

Another object of the present invention is to provide a digital display system in which the display of unnecessary (0) figures is eliminated.

By way of example, according to the present invention, the number registered in the calculator can be displayed in the following sequence:

| Key | | Digital Display Windows No (0) figures displayed |
|---|---|---|
| Not operated | | |
| (1) | key operated | (1) |
| (2) | key operated | (12) |
| (3) | key operated | (123) |
| (4) | key operated | (1234) |

In other words, the highest significant digit of the decimal number is displayed at the leftmost side of the digital display window unit and the following digits, if the number is composed of a plurality of digits, are displayed one after another to the right. The invention is more specifically defined in the appended claims.

An example of the present invention will be hereinafter fully described with reference to the attached drawings, in which:

FIG. 3 shows an arrangement of bits of a shift register in the preferred embodiment of the present invention, wherein

FIG. 4 shows a stage arrangement of the shift register in the preferred embodiment, wherein FIG. 4(a) is a schematic diagram showing the shift register composed of eight stages and FIG. 4(b) is a schematic diagram showing the manner in which each decimal digit is shifted from one stage to another;

Figure 1:
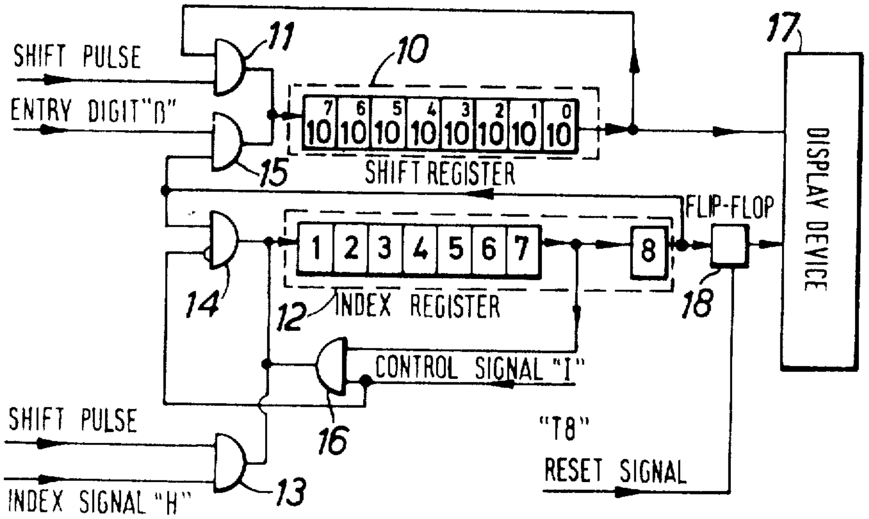
FIG. 1 is a schematic block diagram showing a digital display system according to the preferred form of the present invention.
Figure 5A:
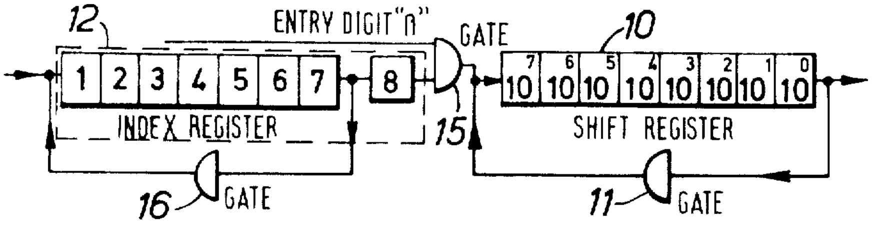
FIG. 5(a) shows a portion of FIG. 1.

Referring now to the attached drawings, reference numeral 10 represents a serial shift register capable of storing and shifting information in the form of various combinations of binary digits "1" and "0" within a four-digit frame representing the numbers zero through nine. In other words, one decimal digit $\beta$ can be expressed by various combinations of binary digits in the form of $\alpha_8$, $\alpha_4$, $\alpha_2$ and $\alpha_1$, wherein the symbol $\alpha$ represents "1" or "0" and numerals 8, 4, 2 and 1 represent the $2^3$, $2^2$, $2^1$ and $2^0$ positions, respectively. If the number of stages of the shift register 10 is assumed to be eight, 32 bits are provided for the number having eight decimal digits $\beta_8$, $\beta_7$ ..... $\beta_2$ and $\beta_1$ in sequence, wherein numerals 8 to 1 represent the $10^7$, $10^6$ . . . . $10^1$ and $10^0$ columns, respectively. In this example, it is necessary to employ eight trains of shift pulses T1, T2 . . . . T7 and T8 each having a pulse duration as expressed by T in order to shift the information from one stage to another.

The information stored in the shift register 10 can be shifted from the first stage 1 to the last stage 8 and circulated back to the first stage 1 through an "and" gate 11. Connected to the input of the shift register 10 is another "and" gate 15 for switching electric signals generated by operating keys (not shown) on the key board of an electronic calculator.

In parallel with said shift register 10 of the type disclosed in U.S. Pat. No. 3,392,270 and has, in the instance shown, eight stages, an index register 12 having the corresponding number of bits is provided for recording the number of stages of entries made by operating the keys, as will be explained later with each stage capable of storing a single bit.

The first stage and the eighth stage of the index register 12 are connected to each other through an inhibitor 14 capable of establishing a circulation path between the first and eighth stages of said register 12. The inhibitor 14 is connected to receive an electric signal "I" as an inhibitor input. The seventh and eighth stages of the register 12 are separated, the junction therebetween being connected to the first stage of the register 12 through an "and" gate 16 capable of establishing a circulation path between the junction and the first stage of the register 12. The signal "I" is also applied to the gate 16. The first bit of the register 12 is further connected with an "and" gate 13 through which an index signal "H" can be applied to said first stage.

Reference numeral 17 represents a digital display device having a pair of terminals, one of which is connected with the output or eighth stage of the shift register 10, while the other is connected with the output of the eighth bit of the index register 12 through a flip-flop 18. This display device is adapted to indicate the entry only while the index signal "H" is applied thereto through the flip-flop 18.

Figure 5B:
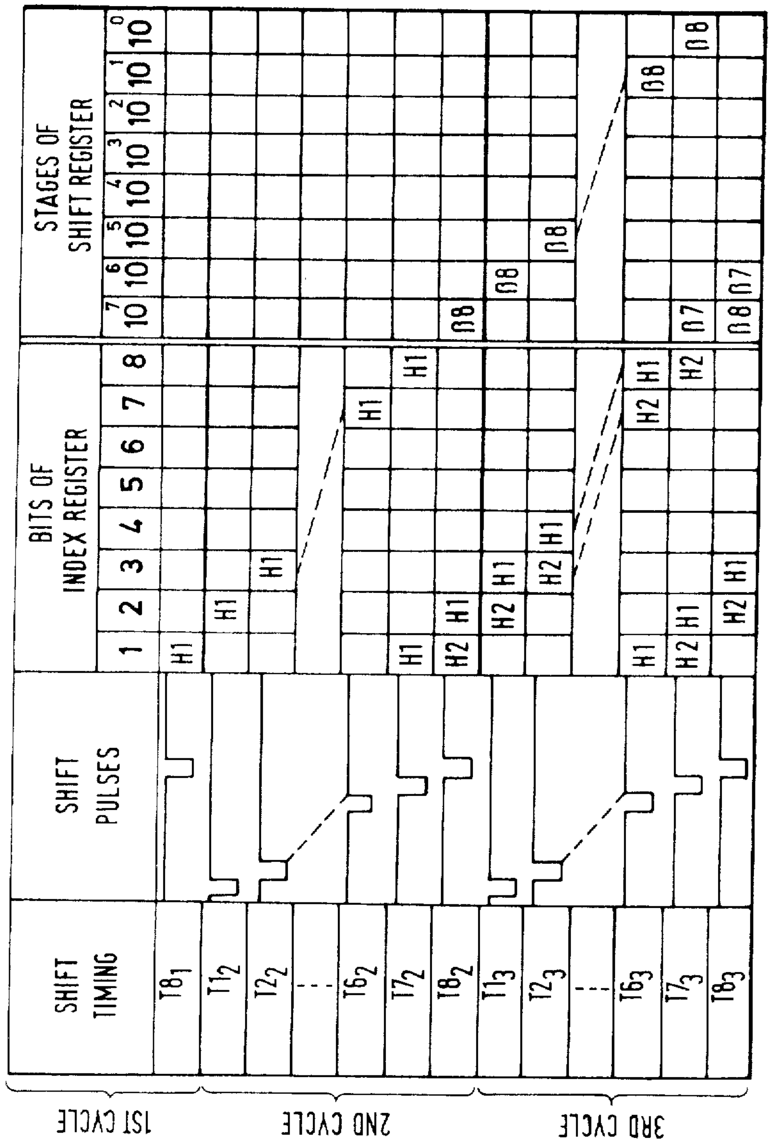
FIG. 5(b) is a schematic diagram showing the manner in which one index signal is shifted in the index register by a train of shift pulses.

In this arrangement, if the highest significant digit $\beta_8$ of the number composed of consecutive decimal digits $\beta_8, \beta_7 \ldots . \beta_2$ and $\beta_1$ is first entered in the calculator, an index signal "H1" is applied to and stored in the first stage of the index register 12 through the gate 13 at time pulse $T8_1$ (FIG. 5(b)). In this manner, during the subsequent pulses $T1_2$, $T2_2 \ldots . T7_2$, the index signal "H1" stored in the first stage is successively shifted therefrom to the eighth stage of the register 12 and, at the subsequent time pulse $T8_2$, the index signal "H1" is returned to the first stage from the eighth bit through the inhibitor 14 by means of the circulation path, unless the digit next to the highest significant digit $\beta_8$ is subsequently entered in the calculator. The index signal "H1" that may be transferred from the eighth stage of the register 12 at time $T8_2$ will turn on the gate 15 to permit the binary coded digits of the entry $\beta_8$ to be stored in the first stage of the register 10. Thus, unless the digit next to the highest significant digit $\beta_8$ is subsequently entered in the calculator, the contents stored in the registers 10 and 12 are respectively circulated in synchronous relation.

However, when the digit $\beta_7$ is entered in the calculator, an electric signal "I" representative of the next adjacent highest significant digit will be applied by a control circuit (not shown) to the gate 16, thereby turning on the latter, so that the inhibitor 14 is turned off. The signal "H1" of the register 12 is shifted to the seventh stage at time $T6_2$. However, at time $T7_2$, the signal "H1" is shifted to the first stage through the gate 16, at the same time as also being shifted to the eighth stage. The signal "H1" that has been shifted to the first stage will be in turn shifted to the second bit during the subsequent timing pulse $T8_2$, while the signal "H1" shifted to the eighth stage is prevented from shifting to the first bit by the inhibitor 14 at the same time. However, when the signal "H1" is shifted to the second stage, the following index signal "H2," representative of the next adjacent highest significant digit, will be applied to the first stage of the index register 12. At times $T1_3$, $T2_3 \ldots . T5_3$ and $T6_3$ in the following cycle of operation, the signals "H1" and "H2" are shifted successively from the third stage to the eighth bit of the index register 12 (FIG. 5(b)). However, at time $T7_3$, the signal "H1" is transferred to the first stage through the inhibitor 14, while the signal "I" is erased. At the same time, the gate 15 is turned on and the binary digit $\beta_7$ is stored in the first stage of the shift register 10. At the subsequent time $T8_3$, the binary digit $\beta_8$ that has been stored in the shift register 10 is transferred from the eighth stage to the first stage, while the binary digit $\beta_7$ is shifted from the first state to the second stage.

As hereinbefore described, when the key representative of the highest significant digit of the decimal number entry is operated, the signal "H1" will be applied to the register 12 through the gate 13 at the shift time $T8_1$ in the first cycle of operation and, subsequently, the binary digits representative of the decimal digit $\beta_8$ will be stored in the shift register 10 through the gate 15 at the shift time $T8_2$ in the second cycle of operation. In the third cycle of operation, the gate 16 is turned on and the signal "H1" is shifted to the right, while the same signal "H1" is applied to the index register 12. However, when the binary digit $\beta_7$ is applied to the gate 15 in the third cycle of operation, this can be registered in the shift register 10 at the shift time $T7_3$ in the same cycle. Similarly, when the key representative of the digit $\beta_6$ is operated to store the latter in the shift register 10, the signal "H1" of the register 12 is shifted to the right during the third cycle of operation in response to the operation of the key. Thus the digit $\beta_6$ can be stored in the register 10 during the subsequent fourth cycle of operation. Accordingly, the time when the signal "H1" is generated from the eighth stage of the index register 12 is T6.

The digital display device 17 is adapted to receive the output signal of the eighth stage of the shift register 10, so that one decimal digit can be displayed at one predetermined position at one shift time. In other words the digital display device 17 is such that the highest significant digit $\beta_8$ is displayed at the leftmost side during time T8 and the digit $\beta_7$ next to the highest significant digit $\beta_8$ is displayed at a rightward position adjacent to the leftmost side during time T7.

The output of the eighth bit of the index register 12 is connected to the input of a flip-flop 18 so that the signal "H" (i.e., "H1," "H2," "H3" and so on) generated by the eighth stage of the index register 12 may set the flip-flop 18. The output of the flip-flop 18 is in turn connected to the digital display device 17 so that the latter can be operated only when the flip-flop 18 has been brought into the set position. However, the flip-flop 18 will be reset at the end of time T8. Accordingly, if the number (1234) is entered in the electronic calculator by operating the relevant keys, the flip-flop 18 will be brought into the set position by the signal "I" from the eighth stage of the index register 12 at time T5 until time T8, while being in the reset position from time T1 to T4. Therefore, no registration of the unnecessary figure (0) will be made in the digital display device during time T1 to T4, while registration of the decimal number (1234) will be made during times T5 to T8 in the following manner.

| Key | Display |
|---|---|
| Not operated | No (0) figures displayed. |
| (1) key operated | (1) figure displayed. |
| (2) key operated | (12) figure displayed. |
| (3) key operated | (123) figure displayed. |
| (4) key operated | (1234) figure displayed. |

Although the present system has been described with various pulse trains each representative of one digit being continuously applied to the shift register during each cycle of operation consisting of times T1 to T8, it should be noted that it is not always necessary to apply the pulse trains to the shift register during each cycle of the operation.

Furthermore, the number of stages of the shift register is not limited to eight, as in the preferred embodiment, provided that the number of stage of the shift register 10 corresponds to the number of stage of the index register 12.

Figure 2:
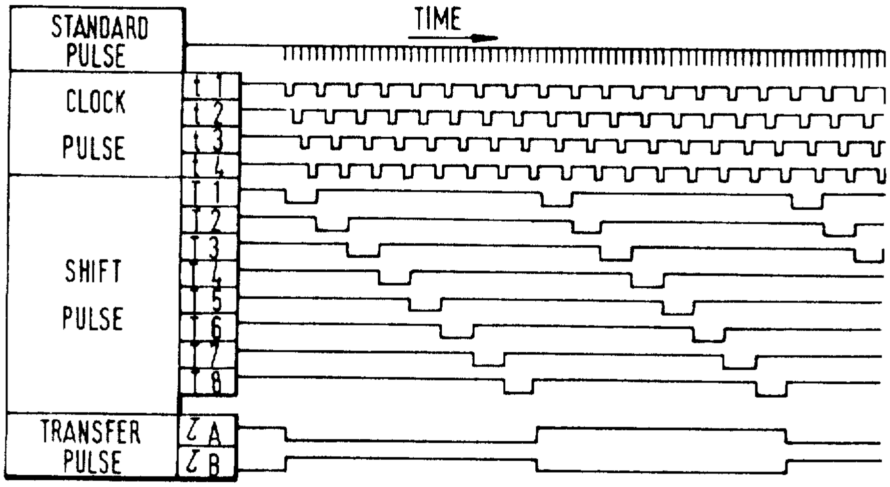
FIG. 2 is a schematic diagram of various pulses employed in this system showing their timing with respect to one another.

FIG. 2 shows the time relationship between standard pulses, the clock pulses t1 to t4, the shift pulses T1 to T8 and the transfer pulses $\tau$A and $\tau$B.

Figure 3A:
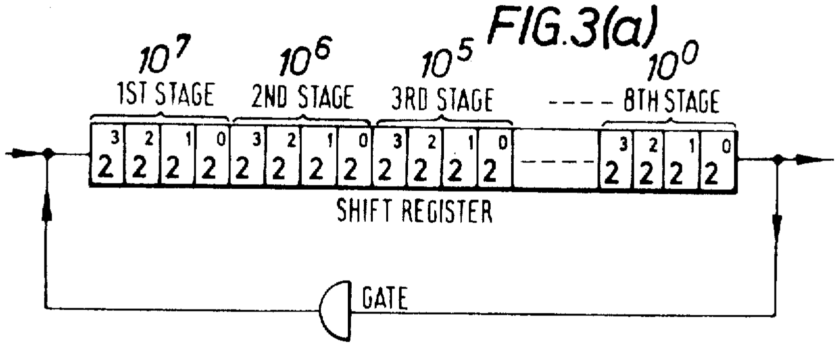
FIG. 3(a) is a schematic diagram showing each stage composed of 4 bits and FIG. 3(b) is a schematic diagram showing the manner in which each bit is shifted to the right.

FIG. 3(a) shows the form taken by each of the shift registers, these being divided into eight stages, identified as the $10^7$, $10^6$, $10^5$ down to $10^0$ stage. Each stage contains four binary digit positions $2^3$, $2^2$, $2^1$ and $2^0$. The gate shown symbolizes the recirculation procedure.

Figure 3B:
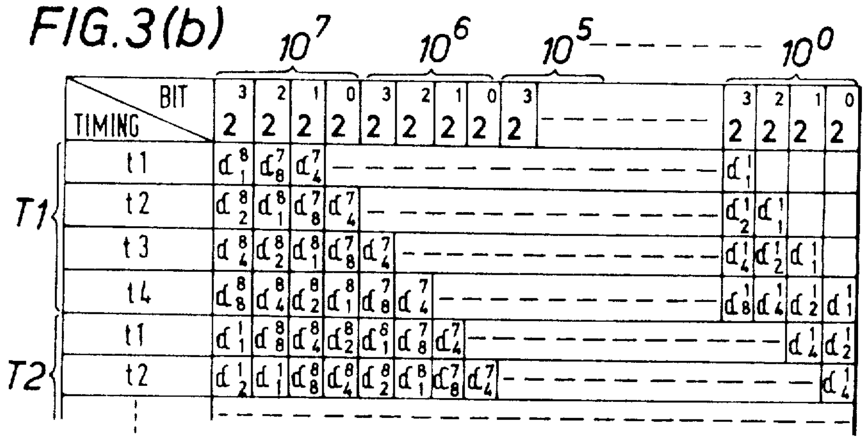

FIG. 3(b) demonstrates how each bit is shifted to the right and recirculated by successive clock pulses t1 to t4 of successive shift pulses T1, T2 etc. For example, the bit $\alpha_1^8$ in position $2^3$ of stage $10^7$ at the first time t1 is moved by the next pulse t2 to the next position to the right, i.e. into position $2^2$ of state $10^7$. Similarly all the other bits are simultaneously moved to the right, the bit in position $2^0$ of stage $10^0$ (i.e. bit $\alpha_1^1$ at pulse t4, T1) being recirculated to position $2^3$ of stage $10^7$ at the next pulse, i.e. t1, T2, and so on.

FIG. 4(a) shows the stage arrangement only of each shift register, again with the gate symbolizing the recirculation. FIG. 4(b) shows the progress of the information around the register for each shift pulse T1 to T12 of a typical transfer pulse period $\tau$, the information here being represented by the decimal digits $\beta_8$ to $\beta_1$.

We claim:

1. A digital display system for use in an electronic calculator, comprising means for applying an electric signal representative of each digit entered in the calculator, a serial shift register, means for displaying the contents stored in said serial shift register, a serial index register having a Plurality of stages capable of storing one bit, the number of said stages corresponding to the number of stages of said serial shift register, means for applying index signals to the first stage of said index register, gate means for receiving the first mentioned electric signal and the output of the last stage of the index register and generating an output signal therefrom to the serial shift register, a control circuit for generating a control signal, means for applying the control signal generated in the control circuit, gate means for receiving the control signal and the output of the last stage of the index register and for supplying the output signal therefrom to the first stage of said index register, and inhibitor means adapted to inhibit the application of said output signal of the last stage of the index register in response to the control signal applied thereto from the control circuit.

2. A digital display system according to claim 1, further comprising a flip-flop electrically connected between the serial index register and the display means and operable to cause the display means to display the contents of the serial shift register only when an output is generated by the last stage of the index register.

* * * * *